(12) United States Patent
Demichele et al.

(10) Patent No.: US 12,096,785 B2
(45) Date of Patent: Sep. 24, 2024

(54) LIPID EMULSION NUTRITIONAL PRODUCT

(71) Applicant: ABBOTT LABORATORIES, Abbott Park, IL (US)

(72) Inventors: Stephen J. Demichele, Dublin, OH (US); Mustafa Vurma, Dublin, OH (US); Megan Terp, Columbus, OH (US)

(73) Assignee: Abbott Laboratories, Abbott Park, IL (US)

( * ) Notice: Subject to any disclaimer, the term of this patent is extended or adjusted under 35 U.S.C. 154(b) by 993 days.

(21) Appl. No.: 16/971,055

(22) PCT Filed: Feb. 19, 2019

(86) PCT No.: PCT/US2019/018496
§ 371 (c)(1),
(2) Date: Aug. 19, 2020

(87) PCT Pub. No.: WO2019/161362
PCT Pub. Date: Aug. 22, 2019

(65) Prior Publication Data
US 2021/0084957 A1 Mar. 25, 2021

Related U.S. Application Data (60) Provisional application No. 62/632,139, filed on Feb. 19, 2018.

(51) Int. Cl.
| | |
|---|---|
| A23L 33/115 | (2016.01) |
| A23L 33/00 | (2016.01) |
| A23L 33/12 | (2016.01) |
| A23L 33/155 | (2016.01) |
| A23L 35/00 | (2016.01) |

(52) U.S. Cl.
CPC ............ A23L 33/40 (2016.08); A23L 33/115 (2016.08); A23L 33/12 (2016.08); A23L 33/155 (2016.08); A23L 35/10 (2016.08)

(58) Field of Classification Search
CPC ........ A23L 33/115; A23L 33/12; A23L 33/30; A23L 33/40; A23L 35/10; A61K 9/107; A61K 9/1075
See application file for complete search history.

(56) References Cited

U.S. PATENT DOCUMENTS

| | | |
|---|---|---|
| 4,169,102 A | 9/1979 | Hameyer |
| 5,082,684 A | 1/1992 | Fung |
| 5,158,798 A | 10/1992 | Fung |
| 5,244,681 A | 9/1993 | Vinci |
| 5,869,118 A | 2/1999 | Morris |
| 5,882,708 A | 3/1999 | Takahashi |
| 6,042,854 A | 3/2000 | Morris |
| 8,163,320 B2 | 4/2012 | Braun |
| 8,986,736 B2 | 3/2015 | Rabinow |
| 2008/0311279 A1 | 12/2008 | Kortum |
| 2010/0003330 A1* | 1/2010 | Baker, Jr ............... A61K 45/06 514/358 |
| 2010/0003351 A1* | 1/2010 | Jaffe .................... A61K 36/575 424/725 |
| 2010/0047358 A1 | 2/2010 | Pouzot |
| 2011/0014279 A1 | 1/2011 | Mora-Gutierrez |
| 2012/0322767 A1* | 12/2012 | Bruzzese ............... A61K 9/107 514/102 |
| 2013/0052235 A1* | 2/2013 | Fattom ................. A61K 39/245 424/231.1 |
| 2013/0122182 A1 | 5/2013 | Lai |
| 2014/0037830 A1 | 2/2014 | Sexton |
| 2014/0057014 A1 | 2/2014 | Berseth |
| 2014/0205712 A1 | 7/2014 | Anthony |
| 2014/0242216 A1 | 8/2014 | Ao |
| 2015/0004238 A1* | 1/2015 | Khangaonkar ...... A61K 31/015 514/763 |
| 2015/0086695 A1 | 3/2015 | Oglesby |
| 2017/0143011 A1* | 5/2017 | Ahtchi-Ali ........... A61K 9/1075 |

FOREIGN PATENT DOCUMENTS

| | | |
|---|---|---|
| GB | 2361927 A | 11/2001 |
| WO | 2003055324 A1 | 7/2003 |
| WO | 2006094995 A1 | 9/2006 |
| WO | 2016050752 A1 | 4/2016 |
| WO | 2016050758 A1 | 4/2016 |
| WO | 2016078956 A1 | 5/2016 |

OTHER PUBLICATIONS

Office Action from Canadian Patent Application No., 3,090,800 dated Aug. 6, 2021 (4 pages).
Written Opinion from Singapore Application No. 11202007929P dated Aug. 11, 2021 (7 pages).
English Translation of Office Action from Chinese Patent Application No. 2019800093469 dated Oct. 21, 2022 (6 pages).
International Search Report and Written Opinion from PCT/US2019/018496 dated May 27, 2019 (16 pages).
Amara et al., "In vitro digestion of citric acid esters of mono- and diglycerides (CITREM) and CITREM-containing infant formula/emulsions", PubMed, Apr. 2014, 42 pages.

(Continued)

*Primary Examiner* — Jeffrey E. Russel
(74) *Attorney, Agent, or Firm* — McAndrews, Held & Malloy, Ltd.

(57) ABSTRACT

Aqueous lipid emulsions for providing enteral nutrition are provided. The aqueous lipid emulsions include at least 33% of lipids, lipid soluble nutrients, or a combination thereof, based upon the total weight of the emulsion, and are essentially free of carbohydrate and protein. The aqueous lipid emulsions are shelf-stable for at least 7 months. The aqueous lipid emulsions are a source of supplemental enteral nutrition for any patient in need thereof, including preterm infants.

18 Claims, 8 Drawing Sheets

(56) References Cited

OTHER PUBLICATIONS

Jacobsen, "Oxidative Stability and Shelf Life of Food Emulsions" In: "Oxidative Stability and Shelf Life of Foods Containing Oils and Fats," Jan. 1, 2016, pp. 287-312.
McClements et al., "Emulsion-Based Delivery Systems for Lipophilic Bioactive Components," Journal of Food Science, vol. 72, No. 8, 2007 pp. R110-R121.
Office Action from Canadian Patent Application No., 3,090,800 dated Feb. 11, 2022 (5 pages).
English Translation of Office Action from Indonesian Patent Application No. P00202005809 dated Dec. 6, 2021 (3 pages).
English Translation of Office Action from Chinese Patent Application No. 2019800093469 dated Mar. 15, 2023.
Office Action from Philippine Office Application No. 1-2020-551248 dated Mar. 30, 2023.
"The 12th Five Year Plan Textbook for Pharmaceutical Biotechnology and Pharmacy Majors: Pharmaceutics", Li Wei, Hubei Science and Technology Publishing House, pp. 44 and 46-47, published on Feb. 28, 2014) (English translation unavailable).
First Examination Report for EP19711447.3 dated Mar. 28, 2024, 5 pages.

* cited by examiner

LIPID EMULSION NUTRITIONAL PRODUCT

CROSS-REFERENCE TO RELATED APPLICATIONS

This application is the U.S. national stage entry of International Application No. PCT/US2019/018496 filed Feb. 19, 2019, which claims priority to and the benefit of U.S. Provisional Patent Application No. 62/632,139, filed Feb. 19, 2018, the entire contents of which are incorporated by reference herein.

FIELD

The present disclosure relates to aqueous lipid emulsions for providing enteral nutrition. More particularly, the present disclosure relates to shelf-stable, high fat aqueous lipid emulsions as a source of supplemental enteral nutrition for any patient in need thereof, including preterm infants.

BACKGROUND

Enteral feeding provides sole, or supplemental, nutrient delivery to patients requiring dietary interventions. In some patients with delicate nutritional needs, it is desirable to provide enteral nutrition that maximizes caloric intake while minimizing extraneous fluid intake. However, it can be particularly challenging to formulate highly concentrated sources of enteral nutrition. Previous attempts to create enteral nutritional products in the form of lipid emulsions with a high proportion of fat have been presented with stability issues, such as fat separation during storage.

SUMMARY

The general inventive concepts are directed to aqueous lipid emulsions for providing enteral nutrition to a patient in need thereof.

In accordance with the present disclosure, an aqueous lipid emulsion comprising at least 33% of lipids, lipid soluble nutrients, or a combination thereof, based upon the total weight of the emulsion is disclosed. The aqueous lipid emulsion is essentially free of carbohydrate and protein. Further, the aqueous lipid emulsion has a pH of from 6 to 7.2. In accordance with the present disclosure, the lipids may comprise at least one emulsifier consisting of citric acid esters of mono- and di-glycerides.

In accordance with the present disclosure, an aqueous lipid emulsion having a shelf life of up to 7 months, or up to 12 months, is disclosed. The aqueous lipid emulsion may have a mean particle size at 7 months that is substantially the same as the mean particle size at the time of manufacturing. Further, the aqueous lipid emulsion may have a mean particle size at 7 months that differs from the mean particle size at the time of manufacturing by less than 10%.

In embodiments of the present disclosure, an aqueous lipid emulsion for providing enteral nutrition to a preterm infant is disclosed.

BRIEF DESCRIPTION OF THE FIGURES

The advantages of the inventive concepts will be apparent upon consideration of the following detailed disclosure, especially when taken in conjunction with the accompanying figures wherein:

FIGS. 7A-D are particle size distribution curves for an exemplary aqueous lipid emulsion of the present disclosure, Emulsion D.

DETAILED DESCRIPTION

Disclosed herein are aqueous lipid emulsions for providing enteral nutrition. While the present disclosure describes certain embodiments of the lipid emulsions in detail, the present disclosure is to be considered exemplary and is not intended to be limited to the disclosed embodiments.

The terminology as set forth herein is for description of the embodiments only and should not be construed as limiting the disclosure as a whole. All references to singular characteristics or limitations of the present disclosure shall include the corresponding plural characteristic or limitation, and vice versa, unless otherwise specified or clearly implied to the contrary by the context in which the reference is made. Unless otherwise specified, "a," "an," "the," and "at least one" are used interchangeably. Furthermore, as used in the description and the appended claims, the singular forms "a," "an," and "the" are inclusive of their plural forms, unless the context clearly indicates otherwise.

To the extent that the term "includes" or "including" is used in the description or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use.

The aqueous lipid emulsions of the present disclosure can comprise, consist of, or consist essentially of the essential elements of the disclosure as described herein, as well as any additional or optional element described herein or which is otherwise useful in nutritional applications.

All percentages, parts, and ratios as used herein are by weight of the total formulation, unless otherwise specified.

All ranges and parameters, including but not limited to percentages, parts, and ratios, disclosed herein are understood to encompass any and all sub-ranges assumed and subsumed therein, and every number between the endpoints. For example, a stated range of "1 to 10" should be considered to include any and all sub-ranges beginning with a minimum value of 1 or more and ending with a maximum value of 10 or less (e.g., 1 to 6.1, or 2.3 to 9.4), and to each integer (1, 2, 3, 4, 5, 6, 7, 8, 9, and 10) contained within the range.

Any combination of method or process steps as used herein may be performed in any order, unless otherwise specified or clearly implied to the contrary by the context in which the referenced combination is made.

The terms "fat" and "oil" as used herein, unless otherwise specified, are used interchangeably to refer to lipid materials derived or processed from plants or animals. These terms also include synthetic lipid materials so long as such synthetic materials are suitable for oral administration to humans.

The term "infant" as used herein, refers generally to individuals up to age 36 months of age, actual or corrected and in certain instances may include toddlers. In certain embodiments, the term infant refers to individuals up to 12 months of age. The term "preterm infant" as used herein refers to those infants born at less than 37 weeks gestation, have a birth weight of less than 2500 gm, or both. The term "toddler" as used herein, unless otherwise specified, refers to a person greater than one year of age up to three years of age.

The term "child" as used herein, unless otherwise specified, refers to a person greater than three years of age to eighteen years of age.

The term "adult" as used herein, unless otherwise specified, refers to a person greater than eighteen years of age.

The term "at the time of manufacturing" as used herein, unless otherwise specified, refers to the time at which an aqueous lipid emulsion as disclosed herein is in its final prepared form, inclusive of any sterilization and packaging, and up to one week thereafter.

The general inventive concepts relate to aqueous lipid emulsions for providing enteral nutrition. More particularly, the inventive concepts relate to shelf-stable, high fat aqueous lipid emulsions as a source of supplemental enteral nutrition for patients including preterm infants. The disclosed aqueous lipid emulsions are formulated to be highly concentrated and calorically dense, with a neutral pH, low osmolality, and requisite shelf-stability.

In embodiments of the present disclosure, the aqueous lipid emulsions comprise lipids, lipid soluble nutrients, or a combination thereof. The aqueous lipid emulsions are generally flowable liquids at room temperature (i.e., at 20 to 25° C.), and are typically in the form of oil-in-water emulsions having a continuous aqueous phase and a discontinuous oil phase.

The aqueous lipid emulsions disclosed herein are essentially free of both carbohydrate and protein. By essentially free of carbohydrate, it is meant that the aqueous lipid emulsions may include a trace amount, preferably no more than 5% by weight, or more preferably no more than 0.1% by weight of carbohydrate. By essentially free of protein, it is meant that the aqueous lipid emulsions may include a trace amount, preferably no more than 1% by weight, or more preferably no more than 0.5% by weight of protein. As those of skill in the art will understand, such trace amounts would typically result from carbohydrate or protein being inherently present in various ingredients; however, any such amount is incidental.

Previous attempts to create aqueous lipid emulsions with a high proportion of fat in the absence of carbohydrates or protein have been presented with stability issues upon storage. The primary observed issue is known as creaming, whereby the fat globules in the aqueous lipid emulsions float to the top of the product. A problem can arise if these fat globules harden, effectively forming a seal across the top of the aqueous lipid emulsion's container. Additionally, these hard, fatty deposits can block or clog feeding tubes.

However, despite these previously-observed issues, it has been surprisingly found that the aqueous lipid emulsions disclosed herein are shelf stable for extended periods. In embodiments of the present disclosure, the aqueous lipid emulsions are shelf-stable for at least 7 months from the time of manufacturing. In embodiments of the present disclosure, the aqueous lipid emulsions are shelf-stable for at least 12 months from the time of manufacturing. The term "shelf-stable" as used herein, unless otherwise specified, refers to an aqueous lipid emulsion that remains commercially stable after being manufactured, packaged, and stored at a temperature from 1 to 40° C., or more typically at room temperature (approximately 25° C.), for a period of time as specified herein.

One method of evaluating the shelf stability of the aqueous lipid emulsions disclosed herein is to observe any variations in the mean particle size during the course of storage. In accordance with the present disclosure, the mean particle size of the aqueous lipid emulsion at 7 months is substantially the same as the mean particle size of the lipid emulsion at the time of manufacturing. In embodiments of the present disclosure, the mean particle size of the aqueous lipid emulsion at 12 months is substantially the same as the mean particle size of the lipid emulsion at the time of manufacturing.

In accordance with the present disclosure, the mean particle size of the lipid emulsion at 7 months differs from the mean particle size of the lipid emulsion at the time of manufacturing by less than 10%, or in some embodiments, by less than 5%. In some embodiments, the mean particle size of the lipid emulsion at 12 months differs from the mean particle size of the lipid emulsion at the time of manufacturing by less than 10%, or in some embodiments, by less than 5%.

In accordance with the present disclosure, the aqueous lipid emulsions have a mean particle size of from 0.2 to 0.9 µm at the time of manufacturing. In embodiments of the present disclosure, the aqueous lipid emulsions have a mean particle size of from 0.3 to 0.5 µm at the time of manufacturing. In embodiments of the present disclosure, the aqueous lipid emulsions have a mean particle size of from 0.32 to 0.39 µm at the time of manufacturing. In embodiments of the present disclosure, the aqueous lipid emulsions have a mean particle size of 0.4 µm or less at the time of manufacturing.

In embodiments of the present disclosure, the aqueous lipid emulsions have a mean particle size of from 0.2 to 0.9 µm both at the time of manufacturing and at 7 months. In some embodiments, the aqueous lipid emulsions have a mean particle size of from 0.3 to 0.5 µm both at the time of manufacturing and at 7 months. In some embodiments, the aqueous lipid emulsions have a mean particle size of from 0.32 to 0.39 µm both at the time of manufacturing and at 7 months. In some embodiments, the aqueous lipid emulsions have a mean particle size of 0.4 µm or less both at the time of manufacturing and at 7 months.

In embodiments of the present disclosure, the aqueous lipid emulsions have a mean particle size of from 0.2 to 0.9 µm both at the time of manufacturing and at 12 months. In some embodiments, the aqueous lipid emulsions have a mean particle size of from 0.3 to 0.5 μm both at the time of manufacturing and at 12 months. In some embodiments, the aqueous lipid emulsions have a mean particle size of from 0.32 to 0.39 μm both at the time of manufacturing and at 12 months. In some embodiments, the aqueous lipid emulsions have a mean particle size of 0.4 μm or less both at the time of manufacturing and at 12 months.

Another method of evaluating the shelf stability of the aqueous lipid emulsions disclosed herein is to observe the zeta potential of the aqueous lipid emulsions during the course of storage. In particular, shelf stability can be observed by measuring the zeta potential of a sample from the supernatant (highest) versus the bottom (lowest) portion of an aqueous lipid emulsion following centrifugation of a sample at 2,000 rpm for at least 10 minutes. Supernatant samples are collected via siphoning an appropriate amount based on the visible cream layer at the top of the sample. Bottom samples are collected via siphoning an equivalent amount from the bottom of the sample. Discrepancies between the two zeta potential values indicate a lack of uniformity in the emulsion.

In accordance with the present disclosure, the zeta potential of the supernatant and bottom portions of the lipid emulsion at 7 months shelf life differs by less than 10%, or in some embodiments, by less than 5%.

In embodiments of the present disclosure, the zeta potential of the supernatant and bottom portions of the lipid emulsion at 7 months shelf life differs by less than ±15 mV, or by less than ±5 mV, or in some embodiments, by less than ±3 mV.

In embodiments of the present disclosure, the aqueous lipid emulsions have a zeta potential at both the supernatant and bottom portions of at least 33 mV at 7 months. In some embodiments, the aqueous lipid emulsions have a zeta potential at both the supernatant and bottom portions of from 33 to 45 mV at 7 months. In some embodiments, the aqueous lipid emulsions have a zeta potential at both the supernatant and bottom portions of from 38 to 44 mV at 7 months. In some embodiments, the aqueous lipid emulsions have a zeta potential at both the supernatant and bottom portions of from 38 to 41 mV at 7 months.

It is known that when enterally infusing the diet of a patient requiring supplemental nutrition, a pH at, or near, neutral is of critical importance. Diets that fall outside the range of neutral (i.e., a pH of less than 5.5 or greater than 7.5) can negatively affect an individual's electrolyte balance. To correct this imbalance, clinicians would need to further supplement the individual's nutrition with electrolytes to counterbalance the overly acidic or overly basic pH.

In accordance with the present disclosure, the aqueous lipid emulsions described herein have a neutral pH. In embodiments of the present disclosure, the aqueous lipid emulsions have a pH of from 5.5 to 7.5. In some embodiments, the aqueous lipid emulsions have a pH of from 6 to 7.2. In some embodiments, the aqueous lipid emulsions have a pH of from 6.5 to 7.2.

In accordance with the present disclosure, the aqueous lipid emulsions may include one or more pH adjusters to facilitate control over the desired pH. The term "pH adjuster" as used herein, unless otherwise specified, refers to a component that can change the pH of a mixture, or a component that when added to a mixture can resist a change to the pH. The pH adjuster may be an acid, a base, a buffer, or combinations thereof. Any food grade acid, base, buffer, and combinations thereof may be used. In embodiments of the present disclosure, potassium hydroxide, sodium hydroxide, citric acid, ascorbic acid, potassium phosphate, calcium hydroxide, sodium citrate, potassium citrate, sodium triphosphate, and combinations thereof, may be added to raise or lower the pH of the aqueous lipid emulsions to an optimal range. In some embodiments, the aqueous lipid emulsions include potassium phosphate.

In embodiments of the present disclosure, the aqueous lipid emulsions comprise from 0.1 to 10 wt. % of one or more pH adjusters, based upon the total weight of the lipid emulsion.

Previous attempts achieve an optimal near-neutral pH within high-fat lipid emulsions have required high amounts of pH adjusters to counteract an observed drop in pH that occurs during manufacturing. For example, previous attempts to manufacture shelf stable, high-fat lipid emulsions have exhibited a pH as low as 5.11 after sterilization, which requires a high concentration of a counterbalancing base to adjust the pH back to neutral.

However, the inventive aqueous lipid emulsions described herein achieve a pH at, or near, neutral while minimizing the concentration of added pH adjuster. In embodiments of the present disclosure, the aqueous lipid emulsions have a potassium content of from 5 to 100 mg per 100 g of the total aqueous lipid emulsion. In some embodiments, the aqueous lipid emulsions have a potassium content of no more than 20 mg/100 g. In some embodiments, the aqueous lipid emulsions have a sodium content of from 2 to 75 mg/100 g. In some embodiments, the aqueous lipid emulsions have a sodium content of no more than 7.4 mg/100 g.

Further, the aqueous lipid emulsions described herein are highly concentrated and calorically dense, yet achieve a low osmolality. In embodiments of the present disclosure, the aqueous lipid emulsions have an osmolality of no more than 80 mOsm/kg $H_2O$. In some embodiments, the aqueous lipid emulsions have an osmolality of no more than 60 mOsm/kg $H_2O$. In some embodiments, the aqueous lipid emulsions have an osmolality of from 10 to 80 mOsm/kg $H_2O$, or from 30 to 60 mOsm/kg $H_2O$, or from 45 to 55 mOsm/kg $H_2O$. In some embodiments, the aqueous lipid emulsions have an osmolality of about 49 mOsm/kg $H_2O$.

In accordance with the present disclosure, the lipids of the aqueous lipid emulsions comprise at least one emulsifier. In embodiments of the present disclosure, the at least one emulsifier comprises citric acid esters of mono- and di-glycerides, either alone or in combination with one or more other emulsifiers. In some embodiments, the at least one emulsifier is GRINDSTED® CITREM manufactured by DuPont Nutrition & Health.

In embodiments of the present disclosure, the aqueous lipid emulsions comprise from 0.1 to 7% of at least one emulsifier, based upon the total weight of the emulsion. In some embodiments, the aqueous lipid emulsions comprise from 0.5 to 6% of at least one emulsifier, based upon the total weight of the emulsion. In some embodiments, the aqueous lipid emulsions comprise from 0.65 to 1.5% of at least one emulsifier, based upon the total weight of the emulsion. In some embodiments, the aqueous lipid emulsions comprise from 0.85 to 1% of at least one emulsifier, based upon the total weight of the emulsion. In some embodiments, the aqueous lipid emulsions comprise from 0.5 to 6% of an emulsifier consisting of citric acid esters of mono- and di-glycerides, based upon the total weight of the emulsion. In some embodiments, the aqueous lipid emulsions comprise from 0.65 to 1.5% of an emulsifier consisting of citric acid esters of mono- and di-glycerides, based upon the total weight of the emulsion. In some embodiments, the aqueous lipid emulsions comprise from 0.85 to 1% of an emulsifier consisting of citric acid esters of mono- and di-glycerides, based upon the total weight of the emulsion.

The aqueous lipid emulsions described herein are formulated to provide highly concentrated enteral nutrition. In accordance with the present disclosure, the aqueous lipid emulsions comprise at least 33 wt. % of lipids, lipid soluble nutrients, or a combination thereof, based upon the total weight of the emulsion. In some embodiments, the aqueous lipid emulsions comprise at least 35 wt. % of lipids, lipid soluble nutrients, or a combination thereof, based upon the total weight of the emulsion. In some embodiments, the aqueous lipid emulsions comprise at least 40 wt. % of lipids, lipid soluble nutrients, or a combination thereof, based upon the total weight of the emulsion. In some embodiments, the aqueous lipid emulsions comprise from 33 to 65 wt. % of lipids, lipid soluble nutrients, or a combination thereof, based upon the total weight of the emulsion. In some embodiments, the aqueous lipid emulsions comprise from 35 to 50 wt. % of lipids, lipid soluble nutrients, or a combination thereof, based upon the total weight of the emulsion. In some embodiments, the aqueous lipid emulsions comprise from 38 to 48 wt. % of lipids, lipid soluble nutrients, or a combination thereof, based upon the total weight of the emulsion.

Non-limiting examples of suitable lipids for use in the aqueous lipid emulsions described herein include coconut oil, fractionated coconut oil, soy oil, high oleic soy oil, corn oil, olive oil, safflower oil, high oleic safflower oil, medium chain triglyceride oil (MCT oil), high gamma linolenic (GLA) safflower oil, sunflower oil, high oleic sunflower oil, palm oil, palm kernel oil, palm olein, canola oil, high oleic canola oil, marine oils, fish oils, algal oils, borage oil, cottonseed oil, fungal oils, microbial derived oils, rice bran oil, wheat bran oil, interesterified oils, transesterified oils, structured lipids, and combinations thereof. As set forth previously, the lipids may comprise one or more emulsifiers.

Suitable lipids for use in the aqueous lipid emulsions described herein include oils and oil blends including long chain polyunsaturated fatty acids. Exemplary oil and oil blend sources of such long chain polyunsaturated fatty acids include soy oil, high oleic soy oil, corn oil, olive oil, safflower oil, high oleic safflower oil, high gamma linolenic (GLA) safflower oil, sunflower oil, high oleic sunflower oil, canola oil, high oleic canola oil, marine oils, fish oils, algal oils, borage oil, cottonseed oil, fungal oils, microbial derived oils, rice bran oil, wheat bran oil, interesterified oils, transesterified oils, and structured lipids.

In embodiments of the present disclosure, the long chain polyunsaturated fatty acids may comprise alpha-linolenic acid (ALA), arachidonic acid (ARA), eicosapentaenoic acid (EPA), docosahexaenoic acid (DHA), gamma linolenic acid (GLA), and combinations thereof.

Non-limiting examples of lipid soluble nutrients suitable for use in the disclosed aqueous lipid emulsions include, but are not limited to, carotenoids, lipid-soluble vitamins, and combinations thereof. In embodiments of the present disclosure, the carotenoids may comprise lutein, zeaxanthin, astaxanthin, alpha- or beta-cryptoxanthin, beta-carotene, lycopene, and combinations thereof. In embodiments of the present disclosure, the lipid-soluble vitamins may comprise synthetic or natural forms of vitamins A, E, D, K, and combinations thereof.

In embodiments of the present disclosure, the aqueous lipid emulsions comprise up to 65% water, based upon the total weight of the aqueous lipid emulsion. In some embodiments, the aqueous lipid emulsions disclosed herein comprise up to 60% water, based upon the total weight of the aqueous lipid emulsion. In some embodiments, the aqueous lipid emulsions disclosed herein comprise from 33 to 67 wt. % water, based upon the total weight of the aqueous lipid emulsion. In some embodiments, the aqueous lipid emulsions disclosed herein comprise from 50 to 65 wt. % water, based upon the total weight of the aqueous lipid emulsion. In some embodiments, the aqueous lipid emulsions disclosed herein comprise from 52 to 62 wt. % water, based upon the total weight of the aqueous lipid emulsion.

The lipid emulsions of the present disclosure may further comprise other optional components that may modify the physical, chemical, aesthetic or processing characteristics of the aqueous lipid emulsions or serve as pharmaceutical or additional nutritional components when used in the targeted population. Many such optional ingredients are known or otherwise suitable for use in medical food or other nutritional products or pharmaceutical dosage forms and may also be used in the compositions herein, provided that such optional ingredients are safe for oral administration and are compatible with the ingredients in the selected product form.

Non-limiting examples of such optional ingredients include preservatives, anti-oxidants, emulsifying agents, buffers, fructooligosaccharides, galactooligosaccharides, human milk oligosaccharides, inositol, gangliosides, surfactants, prebiotics, pharmaceutical actives, additional nutrients as described herein, colorants, flavors, thickening agents and stabilizers, emulsifying agents, lubricants, and so forth.

In embodiments of the present disclosure, additional nutrients added to the aqueous lipid emulsions may include one or more water-soluble vitamins. Exemplary water-soluble vitamins include, but are not limited to, thiamine, riboflavin, pyridoxine, vitamin B12, niacin, folic acid and derivatives, pantothenic acid, biotin, vitamin C, salts and derivatives of any of the foregoing, and combinations thereof.

In embodiments of the present disclosure, the aqueous lipid emulsions are formulated as a source of enteral nutrition. It is envisioned that patients may be administered the aqueous lipid emulsions via any known source of enteral feeding, including feeding via a nasogastric tube (i.e. tube feeding).

The aqueous lipid emulsions disclosed herein are appropriate for enteral administration to a variety of populations, including, but not limited to, preterm infants, infants, toddlers, children, and adults.

In embodiments of the present disclosure, the aqueous lipid emulsions provide a source of supplemental or specialty nutrition to preterm infants. Preterm infants (i.e., infants born prior to 37 weeks gestation) typically have a nutritional disadvantage at birth, as they have been deprived of the period of maximal transfer of nutrients during the last few weeks of pregnancy. Further, a preterm infant's digestion system is less developed than that of a term infant, yet they need more nutrients (calories) than term infants to foster growth and development.

Consequently, nutritional intake is critically important to the preterm infant. In the first few days of life, nutritional intake is often limited as a result of limitation of fluid intake, metabolic imbalances, and the need for other infusions. Although reduced intake is known to be associated with worse long-term neurodevelopmental outcomes, it may be difficult to supply adequate calories during this period. In particular, enteral nutrition is often very difficult for days or weeks in the most nutritionally delicate infants. Intravenous lipid emulsions are important constituents of their parenteral nutrition; however, intravenous lipid emulsions available for routine use in the United States are devoid of DHA and ARA. Because extremely premature infants may rely on intravenous lipid emulsions for the first weeks of life, they may be at increased risk of DHA and ARA deficiency and the potential consequences of low levels. In some instances, their inability to tolerate enteral nutrition is prolonged, likely increasing the deficit of DHA and ARA.

The inventive aqueous lipid emulsions disclosed herein resolve this deficiency, and aid in sustaining the critical plasma levels of DHA and ARA at values that premature infants experience during the third trimester in utero, which reduces the risk for potential negative neurocognitive, respiratory, and visual outcomes.

The aqueous lipid emulsions disclosed herein may have a variety of product densities as appropriate to enteral feeding. In embodiments of the present disclosure, the aqueous lipid emulsions have a density of from 0.8 to 1.2 g/mL. In some embodiments, the aqueous lipid emulsions have a density of from 0.85 to 1.15 g/mL. In some embodiments, the aqueous lipid emulsions have a density of from 0.9 to 1.1 g/mL. In some embodiments, the aqueous lipid emulsions have a density of from 0.95 to 1.05 g/mL.

The aqueous lipid emulsions may have a variety of product viscosities as appropriate to enteral feeding. In embodiments of the present disclosure, the aqueous lipid emulsions have a viscosity of from 2 to 90 cP. In some embodiments, the aqueous lipid emulsions have a viscosity of from 3 to 50 cP. In some embodiments, the aqueous lipid emulsions have a viscosity of from 5 to 40 cP. In some embodiments, the aqueous lipid emulsions have a viscosity of from 6 to 20 cP.

In general, the aqueous lipid emulsions may have a caloric density tailored to the nutritional needs of the ultimate user. In some embodiments of the present disclosure, the aqueous lipid emulsions comprise from 355 to 400 kcal/100 g.

The targeted delivery volume of the aqueous lipid emulsions may vary based upon the needs of the patient receiving enteral nutrition. In some embodiments of the present disclosure, the targeted delivery volume is from 2 to 5 mL per kilogram of body weight per day.

The general inventive concepts have been described above both generally and with regard to various specific exemplary embodiments. Although the general inventive concepts have been set forth in what are believed to be exemplary illustrative embodiments, a wide variety of alternatives will be apparent to those of skill in the art from reading this disclosure. The general inventive concepts are not otherwise limited, except for those instances when presented in specific claims.

EXAMPLES

The following examples are included for the purpose of illustration, and do not limit the scope of the general inventive concepts described herein.

Example 1

Three exemplary formulations were studied to compare the shelf-stability of high-fat aqueous lipid emulsions prepared using different emulsifiers: SOLEC® Soy Lecithin manufactured by DuPont Nutrition & Health, PANODAN® DATEM manufactured by DuPont Nutrition & Health, or GRINDSTED® CITREM manufactured by DuPont Nutrition & Health.

The exemplary lipid emulsions were prepared using identical equipment and packaging. Broadly, the aqueous lipid emulsion samples were prepared by first solubilizing and combining various ingredients into multiple slurries, then combining the slurries into a homogenous aqueous mixture, and thereafter subjecting the aqueous mixture to a sufficient thermal treatment to achieve long-term physical and microbial shelf stability.

More specifically, a first slurry ("Slurry A") was prepared by combining lipid soluble vitamins (e.g., Vitamin E and Vitamin D3), ARA-containing oil, DHA-containing oil, mixed tocopherols, lutein, and the emulsifier specified in Table 1. Slurry A was heated to between 120 and 140° F. Separately, a second slurry ("Slurry B") was prepared, consisting of oils heated to 120 to 140° F. Slurry A was combined into Slurry B under agitation, with the heated temperature of 120 to 140° F. maintained. Water was added to the combined slurries to form an oil-in-water blend, which was maintained at a temperature of 120° F. for no more than two hours. Thereafter, the pH of the oil-in-water blend was adjusted, and the oil-in-water blend was homogenized using one or more in-line homogenizers at pressures from 1,000 to 4,000 psig, with or without a second stage homogenization at from 100 to 500 psig as needed. Following homogenization, the oil-in-water blend was subjected to an HTST (high temperature short time) heat treatment process at 165 to 185° F. for 16 seconds to 2 minutes. After the heat treatment, the sample was cooled in a plate cooler to 33 to 45° F., and then transferred to a refrigerated holding tank. Analytical testing at that point determined whether further pH adjustment was necessary. The final aqueous lipid emulsion was filled into a suitable container under aseptic conditions, or else treated with a terminal sterilization process to allow storage at room temperature.

The aforementioned process was repeated to produce each of the exemplary samples described herein. Each exemplary aqueous lipid emulsion comprised an identical formulation of oils and vitamins, with the only distinguishing feature being the type of emulsifier, as shown in Table 1. Each sample contained 39.5±0.4 wt. % of lipids and lipid soluble nutrients (including the emulsifier), with the balance of 60.5±0.4 wt. % consisting of water.

TABLE 1

| Emulsifier (wt. %) | Emulsion A | Emulsion B | Emulsion C |
|---|---|---|---|
| Lecithin | 7% | — | — |
| DATEM | — | 6% | — |
| CITREM | — | — | 6% |

According to certain regulations, the maximum amount of DATEM and CITREM permissible for use in infant nutrition is 6%.

Each of the exemplary lipid emulsions were stored at room temperature, which was maintained for the duration of the study at 23 to 27° C.

Each of the three exemplary lipid emulsions were observed at 7 months from the time of manufacture, in order to assess the shelf stability of the emulsions. Shelf stability was assessed in two ways: (1) variation in mean particle size during the course of storage, and (2) variation in the zeta potential at the supernatant and bottom of each emulsion after 7 months of storage.

Figure 1:
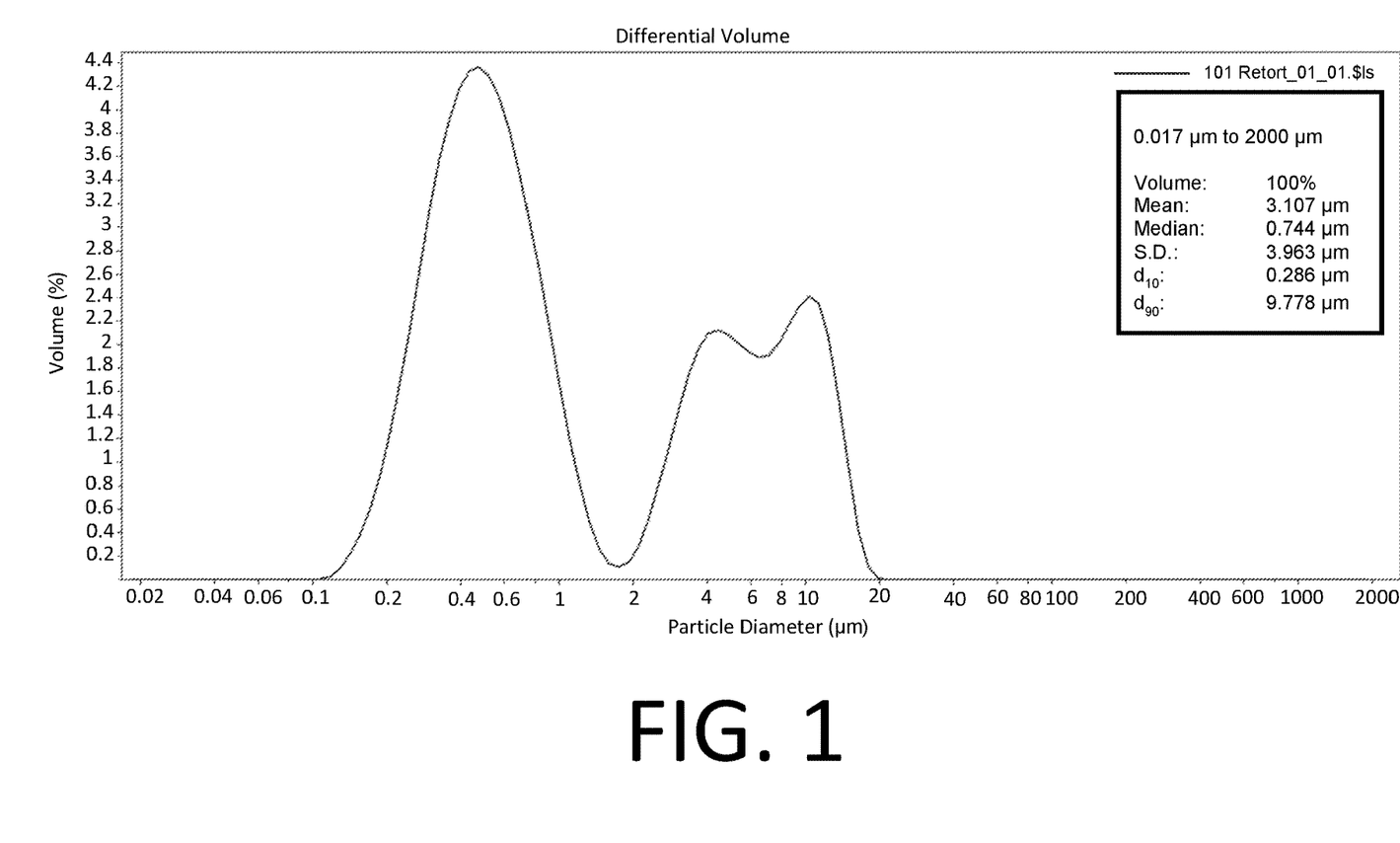
FIG. 1 is a particle size distribution curve for a comparative aqueous lipid emulsion, Emulsion A, at the time of manufacture.
Figure 2:
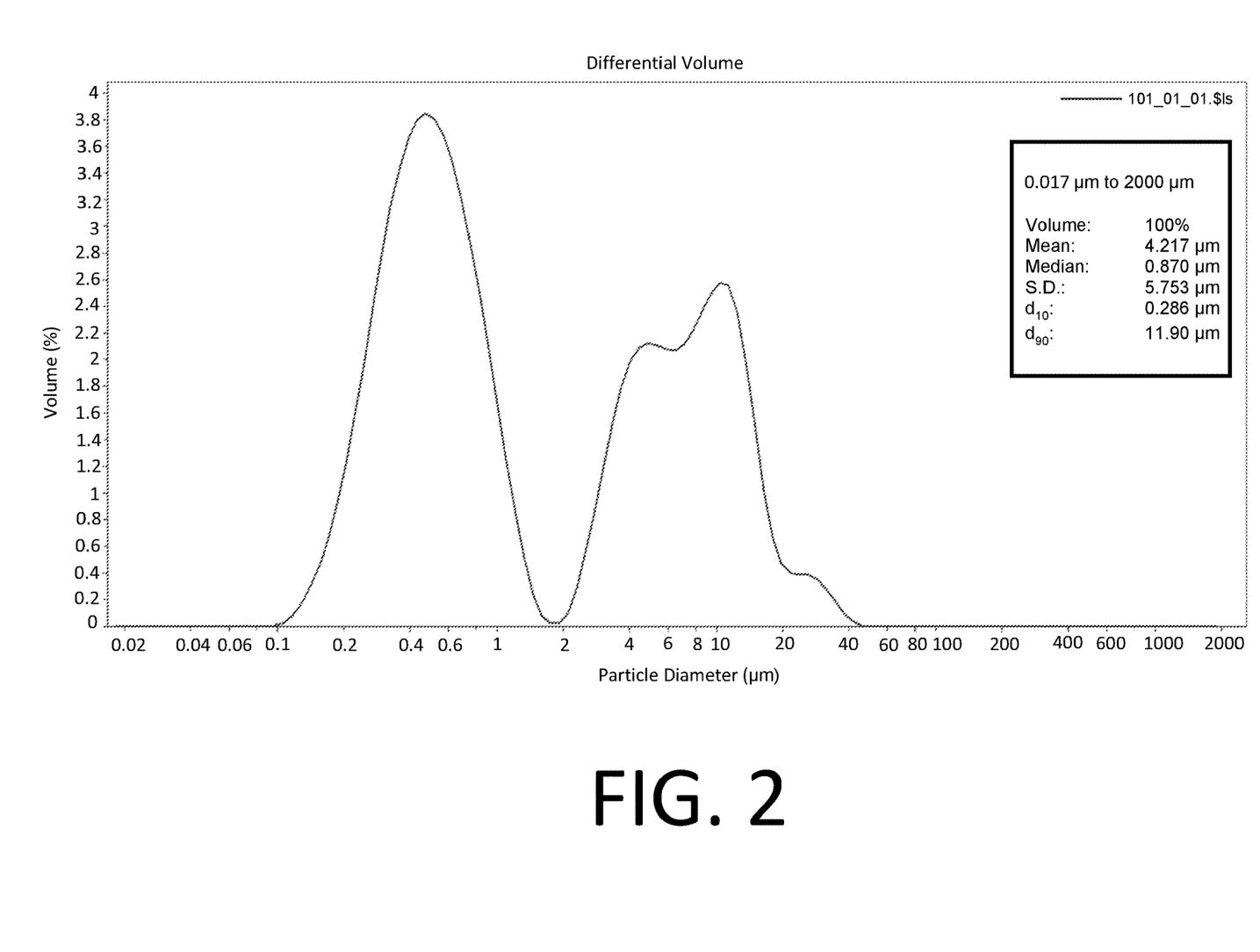
FIG. 2 is a particle size distribution curve for the same comparative aqueous lipid emulsion, Emulsion A, after 7 months of storage.

FIGS. 1 and 2 show the particle size distribution of Emulsion A at the time of manufacture (FIG. 1) and after 7 months of storage (FIG. 2). As shown in FIG. 1, the particle size distribution of Emulsion A is bimodal, and at the time of manufacture Emulsion A has a mean particle size of approximately 3 μm. As shown in FIG. 2, the mean particle size of Emulsion A is approximately 4 μm after 7 months of storage. This increase in mean particle size indicates fat coalescence, and shows that Emulsion A is not stable during the course of storage.

Figure 3:
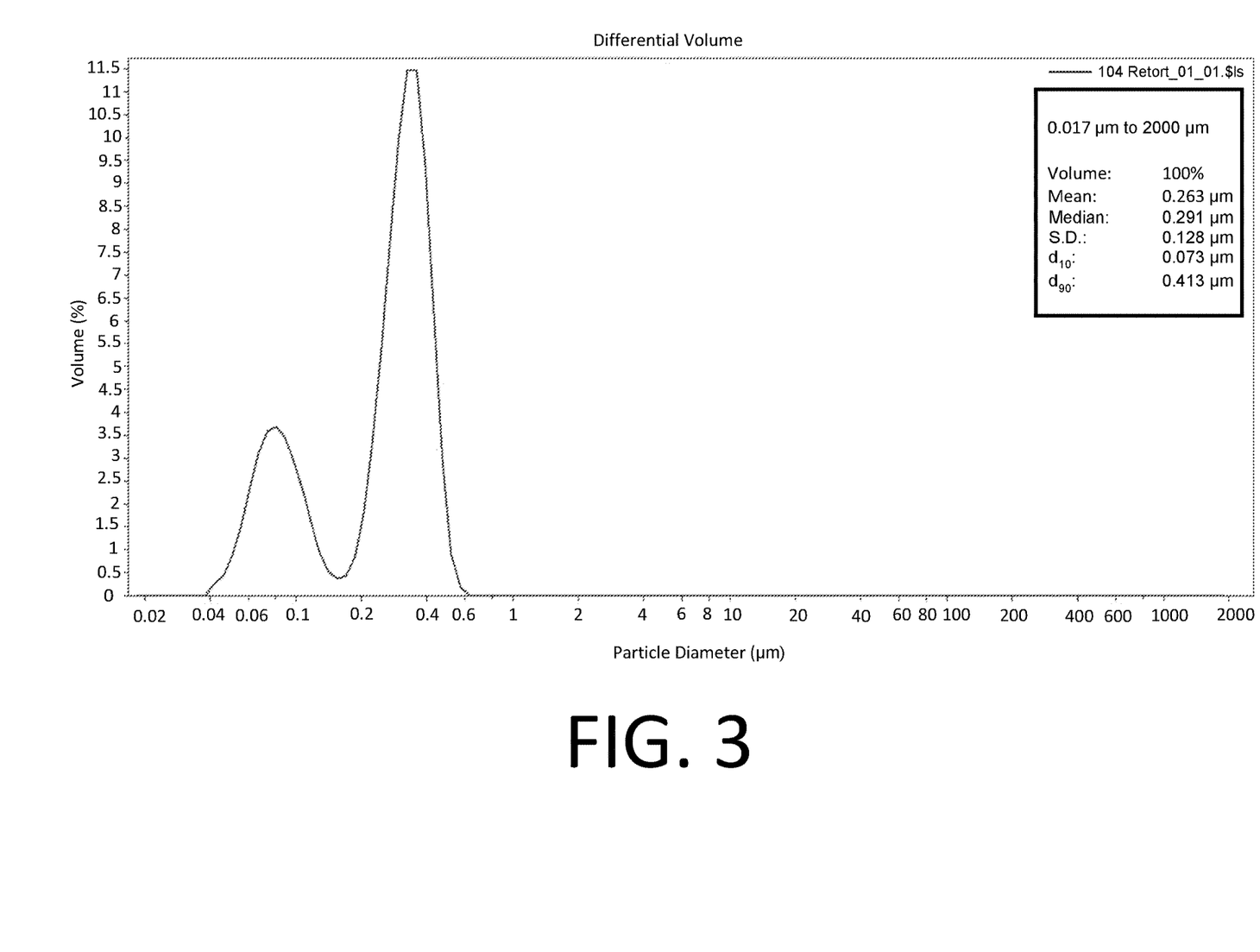
FIG. 3 is a particle size distribution curve for another comparative aqueous lipid emulsion, Emulsion B, at the time of manufacture.
Figure 4:
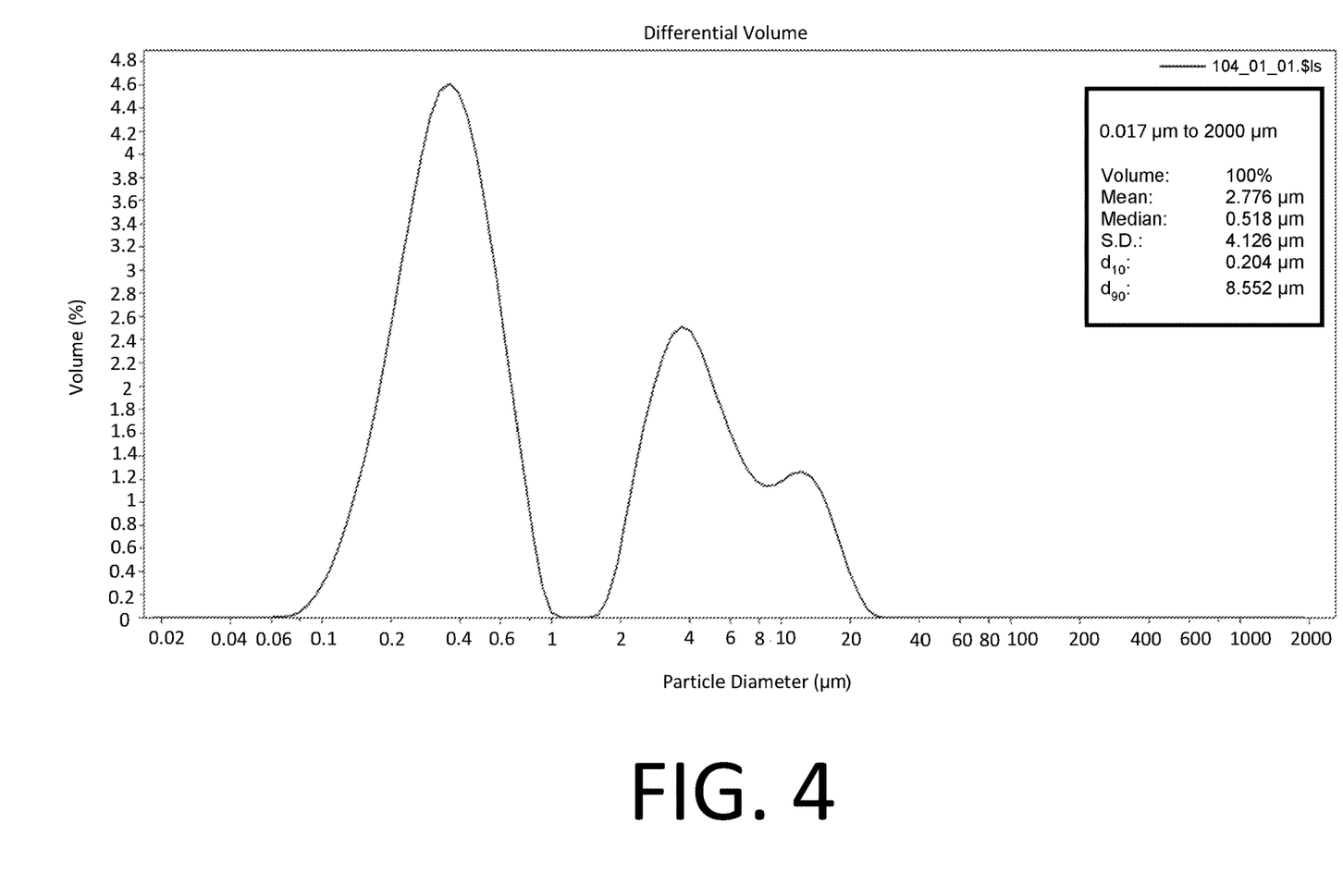
FIG. 4 is a particle size distribution curve for the same comparative aqueous lipid emulsion, Emulsion B, after 7 months of storage.

FIGS. 3 and 4 show the particle size distribution of Emulsion B at the time of manufacture (FIG. 3) and after 7 months of storage (FIG. 4). As shown in FIG. 3, at the time of manufacture the particle size distribution of Emulsion B is bimodal, with a mean particle size of approximately 0.4 μm. FIG. 4 shows that the mean particle size of Emulsion B is substantially larger, approximately 2 μm, after 7 months of storage. This increase in mean particle size indicates fat coalescence, and shows that similar to Emulsion A, Emulsion B is not stable during the course of storage.

Figure 5:
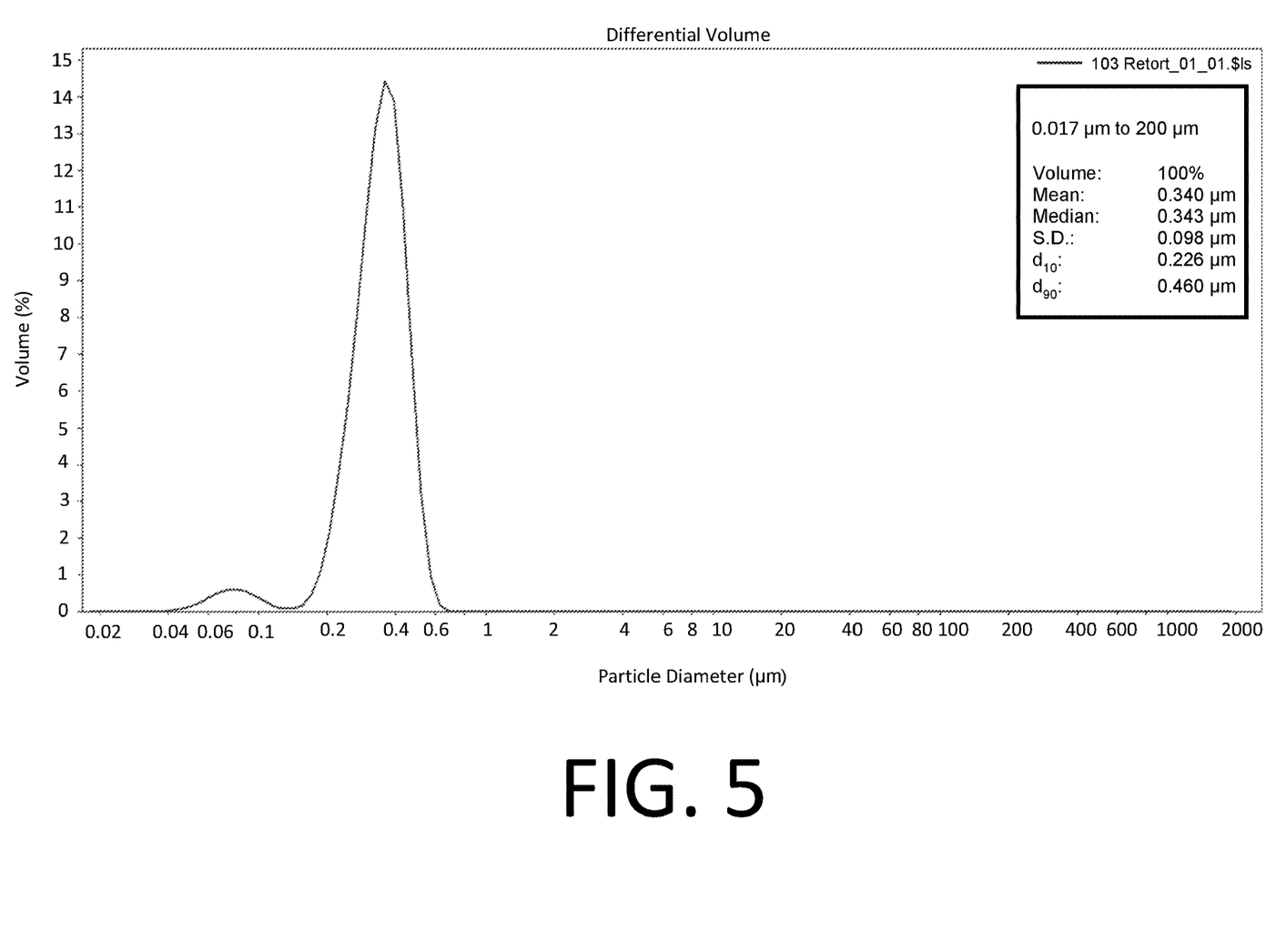
FIG. 5 is a particle size distribution curve for an exemplary aqueous lipid emulsion of the present disclosure, Emulsion C, at the time of manufacture.
Figure 6:
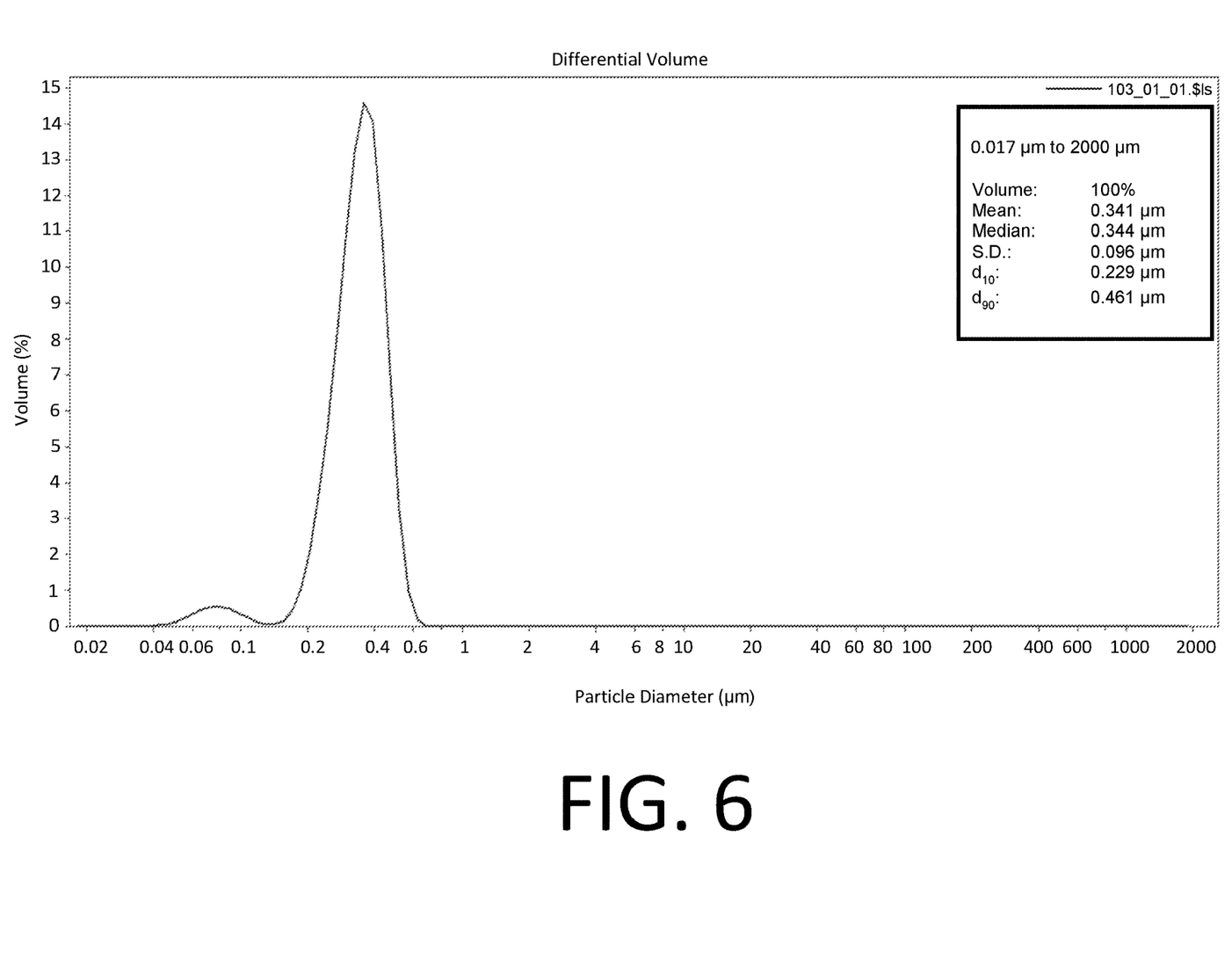
FIG. 6 is a particle size distribution curve for the same exemplary aqueous lipid emulsion, Emulsion C, after 7 months of storage.

FIGS. 5 and 6 show the particle size distribution of Emulsion C at the time of manufacture (FIG. 5) and after 7 months of storage (FIG. 6). As shown in FIG. 5, at the time of manufacture the particle size distribution of Emulsion C is substantially unimodal, with a mean particle size of approximately 0.4 μm. Notably, after 7 months of storage, Emulsion C has substantially the same particle size distribution, and maintains a mean particle size of approximately 0.4 μm, as shown in FIG. 6. The lack of variation in mean particle size over time indicates that Emulsion C is stable, without any perceptible fat coalescence during the course of 7 months of storage.

Shelf stability for each of the three exemplary emulsions was also quantified by measuring the zeta potential of samples from the supernatant (highest) versus the bottom (lowest) portion of each packaged emulsion. To evaluate zeta potential, electrophoretic mobilities were determined using a DELSA 440 (Coulter Electronics) which is an analytical instrument based on laser Doppler velocimetry (LDV). LDV determines the speed of particles by analyzing the Doppler frequency shifts of scattered light relative to the detector at a fixed position. The extent of the Doppler shift in frequency is directly proportional to the velocity of the moving particle. The zeta potential of the particles is derived from their electrophoretic mobilities through the use of the Debye-Huckel equation.

Table 2 shows the zeta potential of samples from the supernatant (highest) versus the bottom (lowest) portion of each packaged emulsion after 7 months of storage:

TABLE 2

| Zeta Potential (mV) | Supernatant | Bottom |
| --- | --- | --- |
| Emulsion A | 22.2 | 27.3 |
| Emulsion B | 24.5 | 32.6 |
| Emulsion C | 40.9 | 38.3 |

As shown in Table 2, only Emulsion C exhibited a similar zeta potential between the supernatant and bottom portions of the emulsion after 7 months of storage, with a deviation of less than 3 mV observed. This similarity indicates that Emulsion C is a uniform emulsion, whereas both Emulsions A and B show significant fat coalescence and instability.

Example 2

A second exemplary lipid emulsion, Emulsion D, was prepared using the identical process and identical composition as Emulsion C. Emulsion D was likewise packaged and stored at room temperature, between 23 and 27° C. The shelf stability of Emulsion D was observed at periodic intervals across 12 months.

Figure 7A:
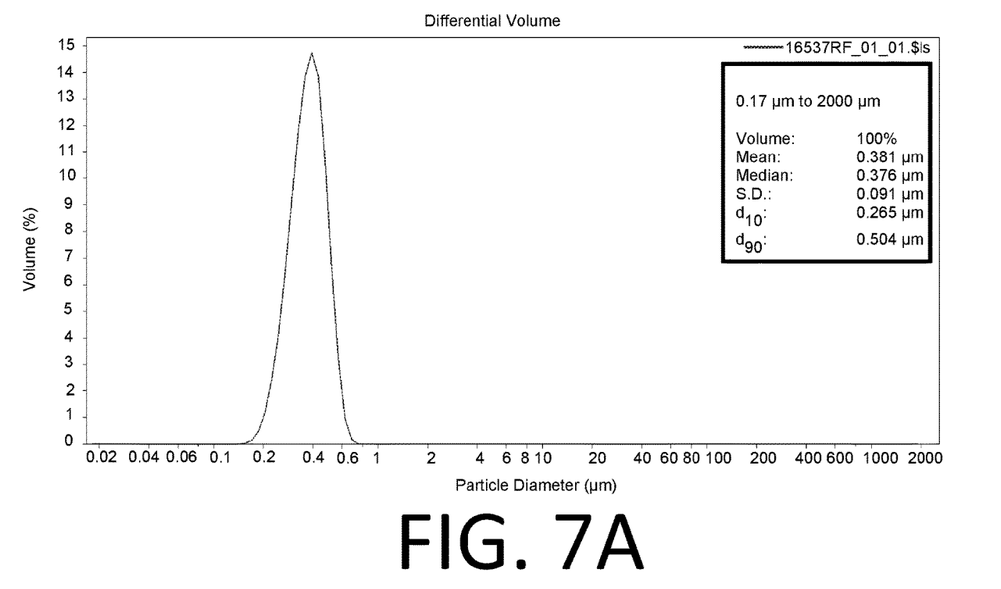
FIG. 7A is the particle size distribution curve for the exemplary Emulsion D at the time of manufacture.
Figure 7B:
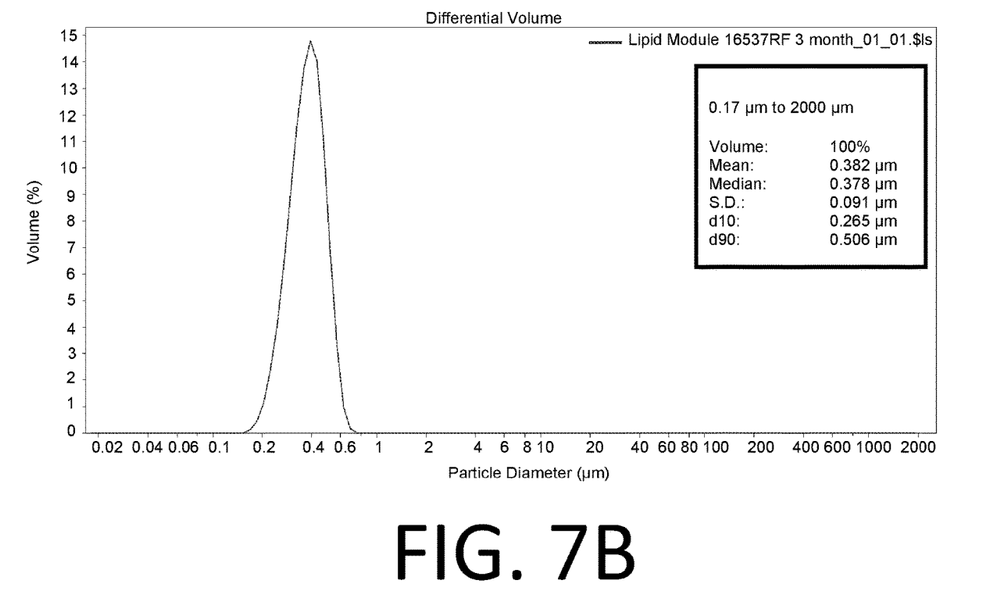
FIG. 7B is the particle size distribution curve for the exemplary Emulsion D after 3 months of storage.
Figure 7C:
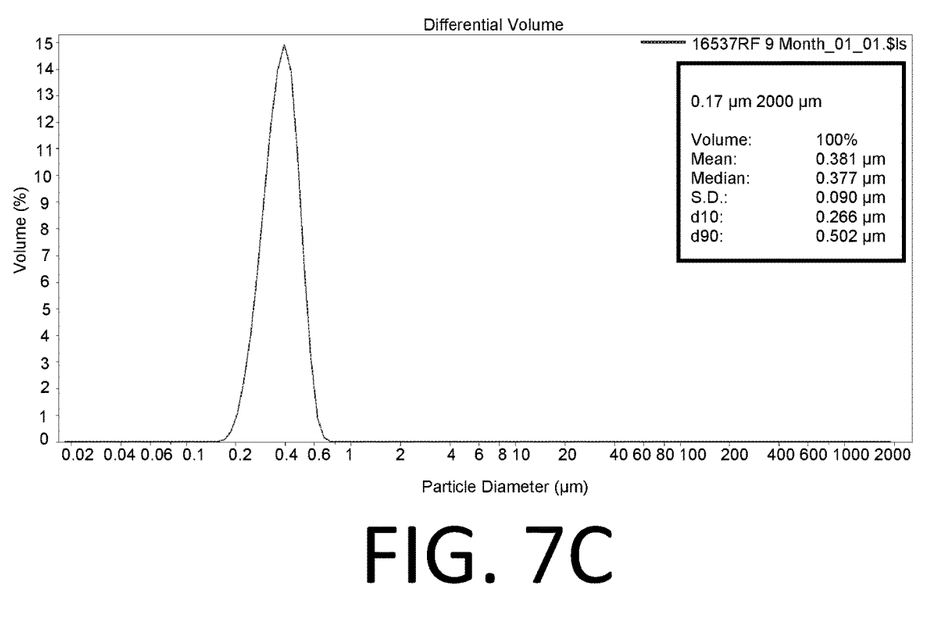
FIG. 7C is the particle size distribution curve for the exemplary Emulsion D after 9 months of storage.
Figure 7D:
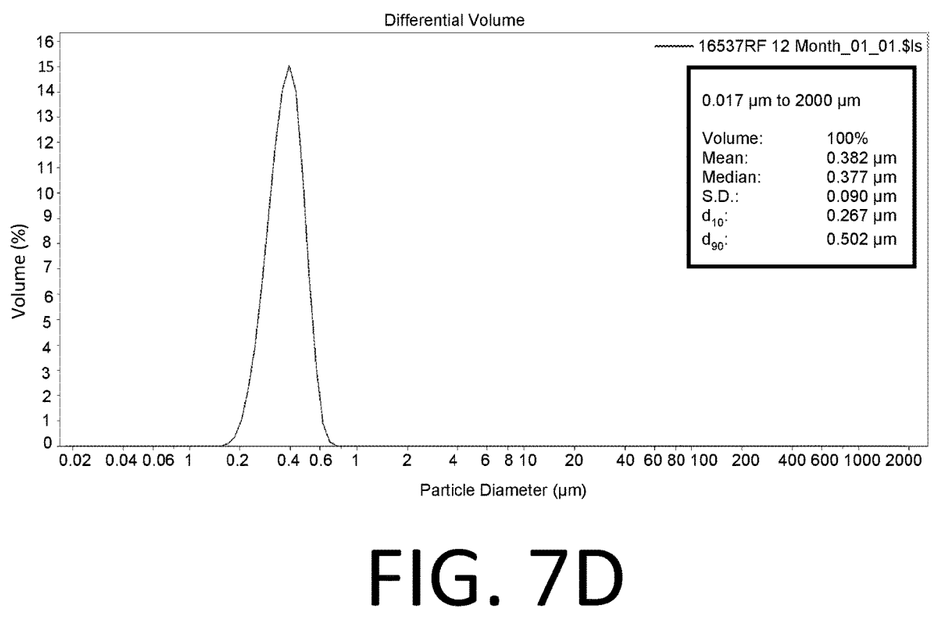
FIG. 7D is the particle size distribution curve for the exemplary Emulsion D after 12 months of storage.

FIGS. 7A-D show the particle size distribution of Emulsion D at the time of manufacture (FIG. 7A), and then at periodic intervals during the course of 12 months of storage. FIGS. 7B, 7C, and 7D show the particle size distribution of Emulsion D after 3 months, 9 months, and 12 months of storage, respectively. As shown in FIGS. 7A-D, Emulsion D maintained substantially the same particle size distribution and mean particle size during the entire course of storage. The lack of variation in mean particle size over time indicates that Emulsion D is stable, without any perceptible fat coalescence during the course of 12 months of storage.

Example 3

Two further lipid emulsions were studied to assess the amount of pH adjuster necessary to achieve a neutral pH. Both of the aqueous lipid emulsions were identical other than the emulsifier component: Emulsion E contained 6 wt. % CITREM, whereas Emulsion F contained 6 wt. % DATEM. Each sample was prepared using the identical process as Example 1, and the pH of each sample was adjusted by adding potassium hydroxide solution (45 wt. % in water) until each sample was adjusted to a pH of 7. As shown in Table 3, Emulsion F required 170 g of 45% KOH per 240 lb of total emulsion, whereas Emulsion E required only 18 g of 45% KOH per 240 lb of total emulsion. In other words, Emulsion F required approximately 9.4 times the amount of pH adjuster as Emulsion E to achieve the desired neutral pH.

TABLE 3

| Sample | Emulsifier | Potassium Hydroxide Solution (g of 45% KOH per 240 lb of Emulsion) |
| --- | --- | --- |
| Emulsion E | CITREM | 18 |
| Emulsion F | DATEM | 170 |

What is claimed is:

1. An aqueous lipid emulsion comprising:
   at least 33% of lipids, lipid soluble nutrients, or a combination thereof, based upon the total weight of the emulsion,
   wherein the lipids comprise at least one emulsifier, and wherein the at least one emulsifier comprises citric acid esters of mono- and di- glycerides,
   wherein the lipid emulsion is essentially free of carbohydrate and protein,
   wherein the lipid emulsion is shelf-stable for at least 7 months,
   wherein the lipid emulsion has a pH of from 5.5 to 7.5, and
   wherein the lipid emulsion is an enteral liquid nutritional.

2. The lipid emulsion of claim 1, wherein the lipid emulsion has a mean particle size of from 0.2 to 0.9 μm at the time of manufacturing.

3. The lipid emulsion of claim 1, wherein the mean particle size of the lipid emulsion at 7 months is substantially the same as the mean particle size of the lipid emulsion at the time of manufacturing.

4. The lipid emulsion of claim 1, wherein the mean particle size of the lipid emulsion at 7 months differs from the mean particle size of the lipid emulsion at the time of manufacturing by less than 10%.

5. The lipid emulsion of claim 1, wherein the lipid emulsion has a mean particle size of from 0.2 to 0.9 μm at the time of manufacturing, and a mean particle size of from 0.2 to 0.9 μm at 7 months.

6. The lipid emulsion of claim 1, wherein the zeta potential of the lipid emulsion at 7 months is substantially the same as the zeta potential of the lipid emulsion at the time of manufacturing.

7. The lipid emulsion of claim 1, wherein the zeta potential of the lipid emulsion at 7 months differs from the zeta potential of the lipid emulsion at the time of manufacturing by less than ±15 mV.

8. The lipid emulsion of claim 1, wherein the lipid emulsion has a pH of from 6 to 7.2.

9. An aqueous lipid emulsion comprising:
at least 33% of lipids, lipid soluble nutrients, or a combination thereof, based upon the total weight of the emulsion,
wherein the lipid emulsion is essentially free of carbohydrate and protein,
wherein the lipid emulsion is shelf-stable for at least 7 months,
wherein the lipid emulsion has a pH of from 5.5 to 7.5,
wherein the lipid emulsion is an enteral liquid nutritional,
wherein the lipids comprise at least one emulsifier, and
wherein the lipid emulsion comprises from 0.1 to 7% of an emulsifier consisting of citric acid esters of mono- and di- glycerides, based upon the total weight of the emulsion.

10. The lipid emulsion of claim 1, wherein the lipid emulsion comprises at least 40% of lipids, lipid soluble nutrients, or a combination thereof, based upon the total weight of the emulsion.

11. The lipid emulsion of claim 1, wherein the lipid emulsion comprises from 35 to 45% of lipids, lipid soluble nutrients, or a combination thereof, and from 55 to 65% water, based upon the total weight of the emulsion.

12. The lipid emulsion of claim 1, wherein the lipids include at least one oil comprising long chain polyunsaturated fatty acids.

13. The lipid emulsion of claim 12, wherein the long chain polyunsaturated fatty acids comprise alpha-linolenic acid (ALA), arachidonic acid (ARA), eicosapentaenoic acid (EPA), docosahexaenoic acid (DHA), gamma linolenic acid (GLA), or combinations thereof.

14. The lipid emulsion of claim 1, wherein the lipid soluble nutrients comprise carotenoids, lipid-soluble vitamins, or combinations thereof.

15. The lipid emulsion of claim 14, wherein the carotenoids comprise lutein, zeaxanthin, astaxanthin, alpha- or beta-cryptoxanthin, beta-carotene, lycopene, or combinations thereof.

16. The lipid emulsion of claim 14, wherein the lipid-soluble vitamins comprise synthetic or natural forms of vitamins A, E, D, K, or combinations thereof.

17. The lipid emulsion of claim 1, wherein the lipid emulsion is a preterm infant liquid nutritional.

18. An aqueous lipid emulsion comprising:
at least 33% of lipids, lipid soluble nutrients, or a combination thereof, based upon the total weight of the emulsion,
wherein the lipids comprise at least one emulsifier, and wherein the at least one emulsifier comprises citric acid esters of mono- and di- glycerides,
wherein the lipid emulsion is essentially free of carbohydrate and protein, and
wherein the lipid emulsion is shelf-stable for at least 7 months, and
wherein the lipid emulsion is an enteral liquid nutritional.

* * * * *